Dec. 15, 1925. 1,565,249
G. A. BERRY
MEANS FOR FEEDING SOLIDS AND SEMISOLIDS TO CHEMICAL APPARATUS
Filed March 17, 1920
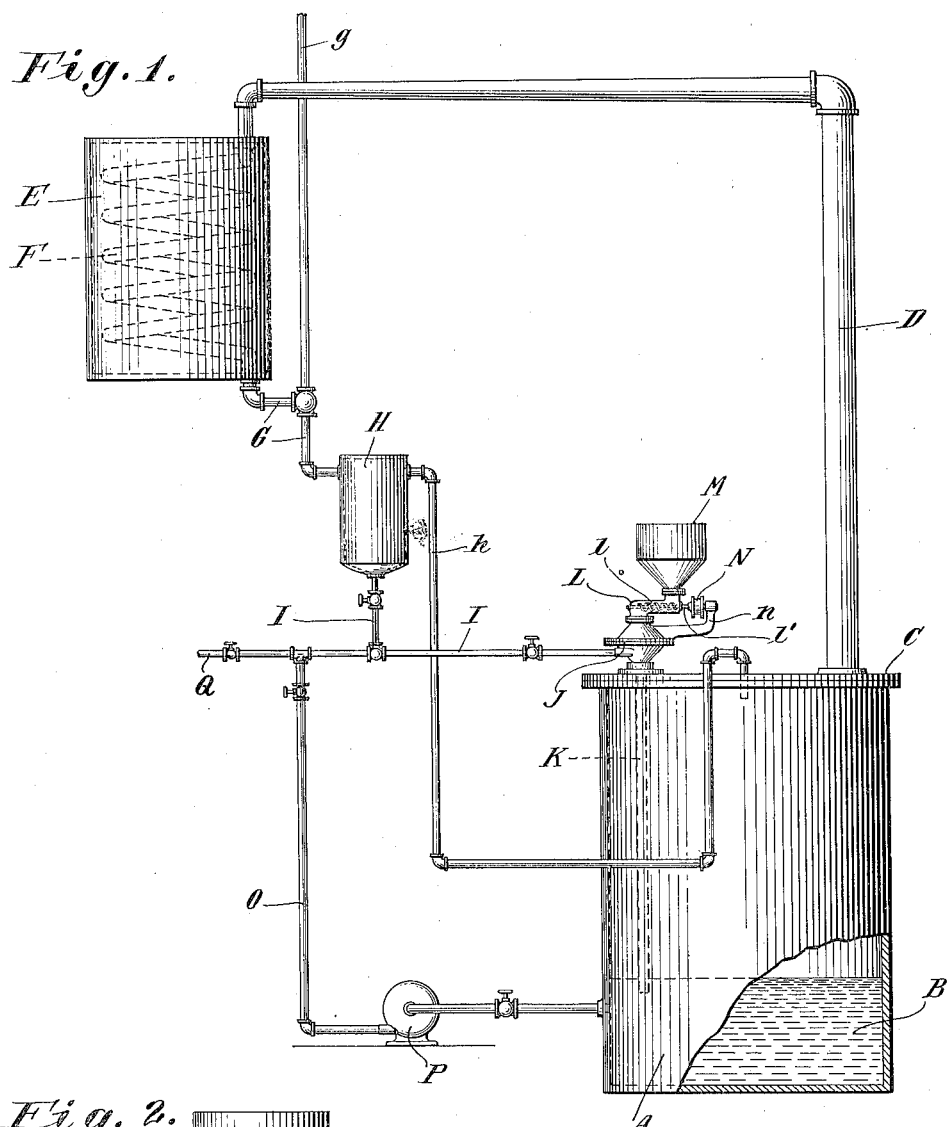
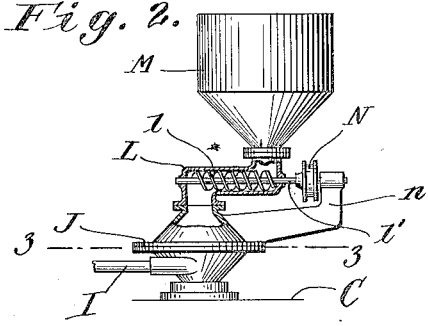
Inventor
George A. Berry.
By His Attorney
Jas. H. Griffin Patented Dec. 15, 1925.

1,565,249

UNITED STATES PATENT OFFICE.

GEORGE A. BERRY, OF SOMERVILLE, NEW JERSEY.

MEANS FOR FEEDING SOLIDS AND SEMISOLIDS TO CHEMICAL APPARATUS.

Application filed March 17, 1920. Serial No. 366,622.

*To all whom it may concern:*

Be it known that I, GEORGE A. BERRY, a citizen of the United States, residing at Somerville, county of Somerset, and State of New Jersey, have invented certain new and useful Means for Feeding Solids and Semisolids to Chemical Apparatus, of which the following is a specification.

The invention, broadly speaking, relates to chemical apparatus, and is directed, more particularly, to the association with such apparatus of means or mechanism for feeding solids, semi-solids, or a mixture thereof, in conjunction with a liquid, or combination of liquids, into usually closed containers, or digesters. The invention is of particular utility in feeding solids or semi-solids to closed containers, in which vapors are being generated, usually under pressure, in such manner as to automatically preclude the loss or escape of such vapors.

In apparatus used for carrying out various chemical operations, it not infrequently occurs that the apparatus embodies a vessel or chamber in which the desired chemical reaction is caused to take place, such vessels being usually sealed to preclude the free loss of gases or vapors generated incident to the chemical operation or operations. Moreover, in the carrying out of chemical processes, it is often necessary from time to time to add to the contents of the vessel, certain agents, re-agents, or catalysts, in order to effect the chemical reaction or transformation desired. For example, in apparatus used in the reduction of nitrocompounds to produce certain amino compounds, such as aniline, toluidine, xylidine, etc., the nitrocompounds operated upon are placed in a closed vessel, or digester, heated in any suitable manner, and it is necessary from time to time, or continuously, to introduce into the vessel, iron in some form or other, usually as filings, borings, turnings, shavings, or other convenient form. A normally sealed or closed vessel has generally been employed in practicing the process, and the iron has usually been introduced through a funnel shaped opening, positioned in the cover of the chamber, which funnel shaped opening is usually closed by a tapered wooden plug or stopper to preclude the escape of the vapors or gases which are frequently of a poisonous nature. However, when the plug is temporarily removed, to allow of the introduction of the iron, the vapors, being generated, which are, in many cases, injurious to health, escape, thereby not only endangering the health of the attendants, but, furthermore, occasioning the loss of certain chemical constituents, which it is preferred to retain within the digester. It is manifest that the manner of feeding described is crude, unsanitary and inefficient. Moreover, the escaping vapors tend to gum or cause adhesion among the iron particles thereby preventing their free flow or feed.

The object of the invention is to so deliver the iron or other solids or semi-solids to the digester or other treatment chamber of a chemical apparatus, that the escape of vapors will be avoided, and that the iron or other solids or semi-solids may be fed intermittently or continuously in measured quantities or at a regulated rate of speed.

In one of its practical forms, the apparatus of the present invention is so constructed that the vapors generated within the digesting vessel flow from the vessel through a closed circuit to a condenser, wherein they are condensed and thereafter returned to the vessel. During the flow of the condensate from the condenser to the vessel, however, there is introduced into said condensate the iron or other solid, or semi-solid material, which it is desired to add to the contents of the vessel, and this material may be introduced into the container either continuously, in the form of a constant, uniform feed, or intermittently, as desired.

Features of the invention, other than those specified, will be apparent from the hereinafter detailed description and claims, when read in conjunction with the accompanying drawings.

The drawings illustrate one practical, specific, embodiment of the invention, but the construction therein shown is to be understood as illustrative, only, and not as defining the limits of the invention.

Figure 1 illustrates, more or less, diagrammatically, a chemical apparatus embodying the present invention.

Figure 2 is a detailed section of a portion of the apparatus; and,

Figure 3 is a section on line 3—3 of Figure 2.

While the present invention is adapted for broad and general application in the chemical arts, for its intended purposes, I will, for the purpose of illustration, and in the interest of brevity, describe the same as embodied in a so-called reduction apparatus, of the general character heretofore described. With this illustration in mind, reference may be made to the drawing, wherein A designates the vessel or digester in which the reduction is carried out.

This vessel is usually in the form of a digester or closed kettle, of convenient shape and proportions, and is adapted to contain a suitable quantity of the nitro-compound and other ingredients B, under treatment. The top of the kettle is tightly closed by a suitable cover C so that when the contents of the vessel are heated, in any suitable manner, the escape of vapors arising from the material operated upon, except as provided, may be precluded from unrestricted exit from the vessel. Such vapors, however, as are allowed to escape from the confines of the vessel, through pipe D pass to any suitable form of condenser E. This condenser is shown in the drawings as embodying a casing in which is positioned a coil F. A suitable cooling or refrigerating agent, e. g., water, or brine, is circulated about the coil for the purpose of condensing the vapors passing therethrough and the resulting condensate is led from the condenser through a pipe G which preferably delivers the condensate into a supply tank H. The pipe G is preferably vented through the employment of a pipe g, as shown in the drawing.

The supply tank H is provided with an overflow h leading back to the vessel A. This pipe serves merely to return the condensate into the vessel in case the supply tank overflows, but the normal exit of the condensate from said tank is accomplished through a pipe I which leads from substantially the bottom of the supply tank to a mixing funnel J superimposed on the vessel and in which the iron filings or other solid or semi-solid material may be commingled with the condensate, or other liquid before said condensate or other liquid is fed into the interior of the vessel.

The mixing and feeding funnel, as shown in the drawing, is preferably formed in two parts, flanged and bolted together and the lower section of which funnel is secured to the cover C of the vessel. The lower section is provided with a hollow tubular stem or pipe K, which extends downwardly into the vessel and preferably terminates below the surface of the contents thereof. It is through this pipe that the condensate, or other liquid, after flowing into the mixing funnel J is caused to enter the vessel. The upper section of the mixing funnel is provided with an opening at its apex and with this opening communicates the outlet end of a screw feed conveyer L, the inlet end of said conveyer being positioned below the delivery end of a hopper M. The screw l of said conveyer is fixed on shaft l', the outer end of which may be journalled in a bracket n carried by the upper section of the mixing funnel. The shaft l' may be rotated by any suitable power means such as a motor or the like, but for the purpose of illustration, I have shown a pulley N fixed on said shaft and adapted to be operated by a belt to impart rotation thereto. In practice, this rotation may be constant or intermittent as desired.

With this construction, it will be apparent that iron filings or other matter deposited in the hopper M will be delivered by the conveyer L to the mixing funnel into which they will fall by gravity. It will be noted, however, from Figure 2 of the drawing, that the pipe I enters the mixing funnel off center, and this fact, together with the fact that the liquid enters the mixing funnel under more or less hydrostatic pressure, brings about swirling action of said condensate within the mixing chamber, the liquid partaking of a pronounced swirling action before entering and descending through the pipe K into the kettle. The iron filings fall from the delivery entrance of the conveyor into the swirling liquid and, becoming thoroughly commingled therewith pass with said liquid into the digester. Manifestly, any tendency of the solid or semi-solid matter to adhere to the surface of the funnel is thereby avoided. It will be obvious that mechanical feeding means, other than the screw conveyer described, may be employed for feeding the iron filings or borings in the manner described, the screw feed being, merely, the device which it is preferred to use for this purpose.

The foregoing manner of introducing the solid or semi-solid material into the vessel through the employment of the condensate of vapors generated in the vessel operates with high efficiency in practice, but the present invention is not limited to this precise manner of introducing such solids or semi-solids. In practice, this may be accomplished by liquids other than the condensate, and the apparatus shown in the drawings is so constituted as to permit of the other forms of introduction. To this end, a pipe O may lead from a point below the surface of the liquid in the vessel to the pipe I and a pump P, of any suitable form, may be included in the pipe O for the purpose of drawing liquid from within the vessel and feeding it to the mixing chamber J. In this instance, the solids or semi-solids are carried into the vessel by liquid drawn therefrom by the pump P.

Moreover, liquid for feeding the solids or semi-solids into the vessel may be led from an outside source through a pipe Q, which is shown as jointed into the pipe O. The several pipes of the apparatus are suitably valved so that the liquid may be fed through either of the several pipes referred to; i. e., the condensate from a tank H through the pipe I to the mixing chamber, through the pipes O and I to the mixing chamber, or through the pipes Q and I to the mixing chamber. In the first instance, the condensate is fed, in the second instance, the liquid from the vessel is drawn therefrom and returned thereto through the mixing chamber, and in the third instance, the liquid circulated through the mixing chamber comes from an outside source. Furthermore, the pipe I may lead into the mixing chamber otherwise than, off center as shown in Figure 3.

In the foregoing specification, I have set forth apparatus adapted to carry out the present invention in various illustrative ways, but it will be understood that the apparatus shown and described may be modified as to details of construction or the employment of equivalents, without departing from the spirit or substance of the invention, the scope of which is commensurate with the appended claims.

Having thus fully described the invention, what I claim as new and desire to secure by Letters Patent is:

1. In an apparatus for feeding solids or semisolids into a closed receptacle, the combination of a substantially closed receptacle, means for conveying vapors out of the receptacle, means for condensing said vapors, means for returning the condensate into the receptacle, and means for entraining solid or semisolid material in the returning condensate prior to its entry into the receptacle, whereby said material is carried into the receptacle by the condensate.

2. In an apparatus for feeding solids or semisolids into a closed receptacle, the combination of a substantially closed receptacle, a condenser exteriorly of the receptacle, means for leading vapors generated within the receptacle out of the receptacle and to the condenser, wherein they are condensed, means for leading the condensate back to the receptacle, and means for introducing foreign matter into the condensate during its passage from the condenser to the receptacle.

3. In an apparatus for feeding solids and semisolids into a closed receptacle, the combination of a substantially closed receptacle, a tapering mixing chamber, the small bottom end of which communicates with the interior of the receptacle, a fluid inlet pipe leading tangentially into said chamber, and means for introducing solid or semisolid materials into said chamber whereby said materials will fall by gravity into the liquid passing through the chamber to be commingled therewith and carried thereby into the receptacle without exposing the contents of the receptacle.

4. In an apparatus for feeding solids and semisolids into a closed receptacle, the combination of a substantially closed receptacle, a tapering mixing chamber, the small bottom end of which communicates with the interior of the receptacle, a fluid inlet pipe leading tangentially into said chamber, and a screw conveyor for mechanically feeding solid or semisolid materials into the top of the chamber to discharge said materials into the liquid passing through the chamber, whereby said materials will be commingled with and carried by the liquid into the receptacle without exposing the contents of the receptacle.

5. In an apparatus for feeding solids or semisolids into a closed receptacle, the combination of a substantially closed receptacle containing material to be treated, a condenser positioned externally of said receptacle and adapted to condense vapors generated in the receptacle during the treatment of the material therein, means for returning the condensate to the receptacle, and means for introducing foreign material into the condensate during its return to the receptacle, whereby the introduction of such foreign material into the receptacle is facilitated.

6. In an apparatus for feeding solids or semisolids into a closed receptacle, the combination of a substantially closed receptacle, a closed circuit for circulating the vapors generated in said receptacle exteriorly thereof to condense said vapors and return the condensate to the vessel, and means for introducing foreign matter into the condensate before said condensate enters the receptacle.

7. In an apparatus for feeding solids or semisolids into a closed receptacle, the combination of a substantially closed receptacle adapted to contain material to be treated, a condenser positioned exteriorly of the receptacle, means for leading vapors from the interior of the receptacle to the condenser for the purpose of condensing said vapors, a supplemental receptacle into which the condensate is deposited, means for leading the condensate from said supplemental receptacle to the main receptacle, and means positioned between the main and supplemental receptacles for introducing foreign material into the condensate prior to its introduction into the main receptacle.

8. In an apparatus for feeding solids or semisolids into a closed receptacle, the combination of a substantially closed receptacle, adapted to contain material to be treated, a condenser positioned exteriorly of the receptacle, a pipe leading from the receptacle to the condenser and adapted to convey vapors generated within the receptacle to the condenser, whereby they may be condensed, means for returning the condensate to the receptacle, and means for introducing foreign matter into the condensate prior to its introduction into the receptacle.

9. In an apparatus for feeding solids or semisolids into a closed receptacle, the combination of a substantially closed receptacle adapted to contain material to be treated, a condenser positioned exteriorly of the receptacle, means for conveying vapors from the interior of the receptacle to the condenser, for the purpose of condensing the same, a mixing chamber, means for depositing foreign matter within the mixing chamber, and means for circulating the condensate through the mixing chamber to entrain said foreign matter previous to the return of said condensate to the receptacle.

10. In an apparatus for feeding solids or semisolids into a closed receptacle, the combination of a substantially closed receptacle, a condenser, means for conveying vapors from the receptacle to the condenser for the purpose of condensing the same, a mixing chamber, a hopper adapted to contain foreign matter, means for delivering the condensate from the condenser into the mixing chamber off center, whereby said condensate partakes of a swirling action within the mixing chamber, a conveyor for conveying foreign matter from the hopper and depositing it within the swirling condensate within the mixing chamber, and means for delivering the commingled condensate and foreign matter from the mixing chamber into the receptacle.

11. In an apparatus for feeding solids or semisolids into a closed receptacle, the combination of a substantially closed receptacle adapted to contain material to be treated, a condenser, means for conveying the vapors generated within the receptacle to the condenser for the purpose of condensing the same, a supplemental receptacle positioned above the main receptacle and adapted to receive the condensate from the condenser, a mixing chamber, means for delivering the condensate under hydrostatic pressure to the mixing chamber off center for the purpose of effecting a swirling action of the condensate within the mixing chamber, a hopper adapted to contain foreign matter, a screw conveyor for delivering the foreign matter from the hopper into the mixing chamber whereby it is entrained in the swirling condensate and thoroughly commingled therewith, and means for delivering the commingled condensate and foreign matter into the interior of the main receptacle.

In testimony whereof, I have signed my name to the foregoing specification.

GEORGE A. BERRY.